310-13 SR SEARCH ROOM
FIP8502 OR 3,144,570

Aug. 11, 1964 J. E. CROWLEY 3,144,570

PRINTED CIRCUIT SYNCHRO

Filed Aug. 19, 1960 2 Sheets-Sheet 1

INVENTOR.
JOHN E. CROWLEY
BY George W Field
ATTORNEY

*INVENTOR.*
JOHN E. CROWLEY

*BY* George W. Field

ATTORNEY 3,144,570
PRINTED CIRCUIT SYNCHRO
John E. Crowley, St. Anthony Village, Minn., assignor to Minneapolis-Honeywell Regulator Company, Minneapolis, Minn., a corporation of Delaware
Filed Aug. 19, 1960, Ser. No. 50,771
6 Claims. (Cl. 310—13)

This invention relates to the field of dynamoelectric machines, and particularly to self-synchronous alternating current machines of which synchro-transmitters and synchro-repeaters are respresentative but not exclusive examples.

In the growing class of indicators wherein the indicia-bearing element is a tape of considerable length, the use of a synchro of conventionally cylindrical shape has certain disadvantages by reason of its volume, its need to be geared to the tape transport mechanism, and the fact that its outline does not comport well with the flat configuration of the tape instruments.

It is a principal object of this invention to make possible a reduction in the volume of tape instruments having synchro outputs or inputs by embodying the synchro in the unit and letting the tape itself act as a portion of the synchro.

Other objects, advantages, and features of novelty, not individually enumerated above, which characterize my invention, are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described certain preferred embodiments of my invention.

Figure 5:
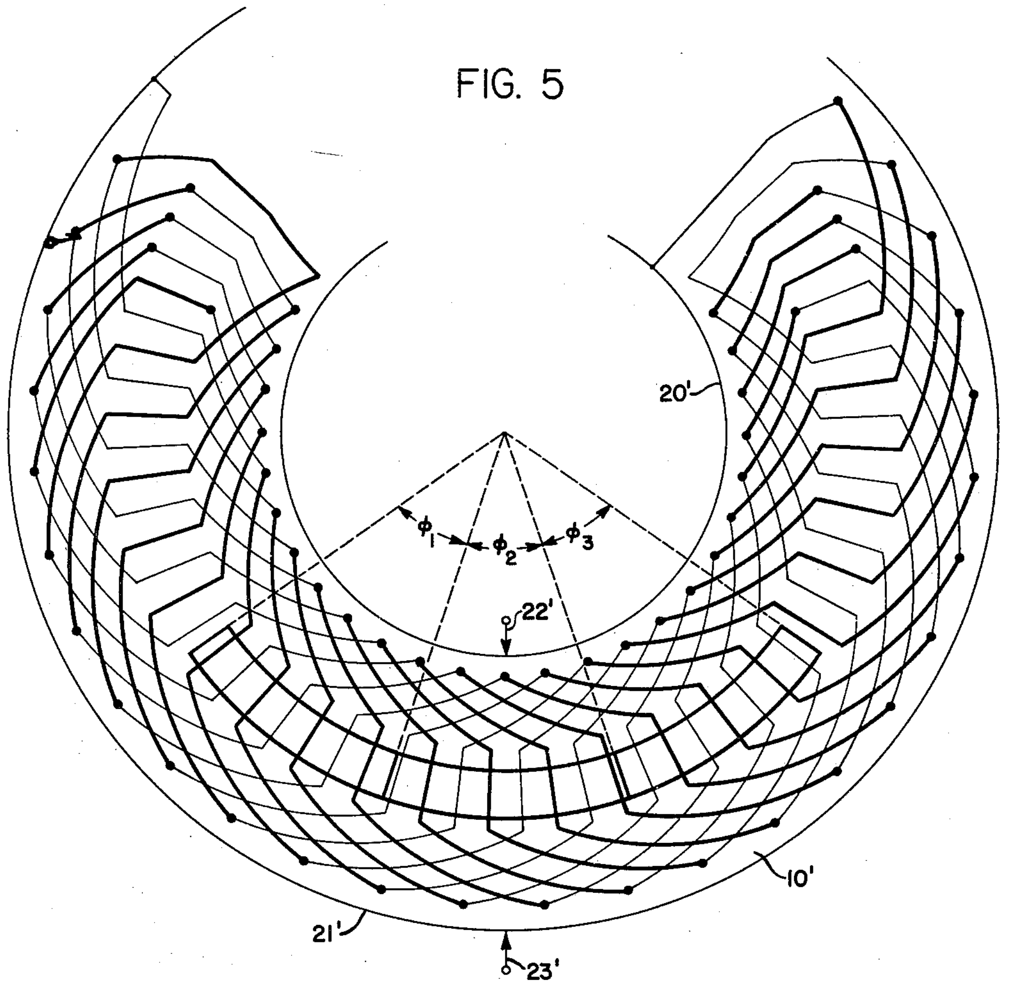
Figure 1:
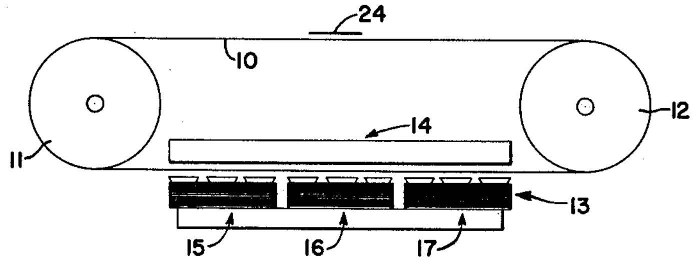
Figure 2:
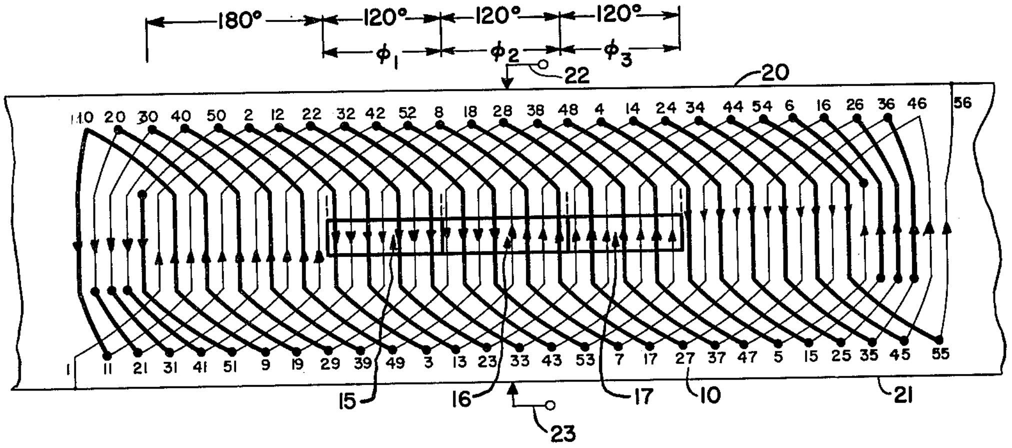
Figure 3:
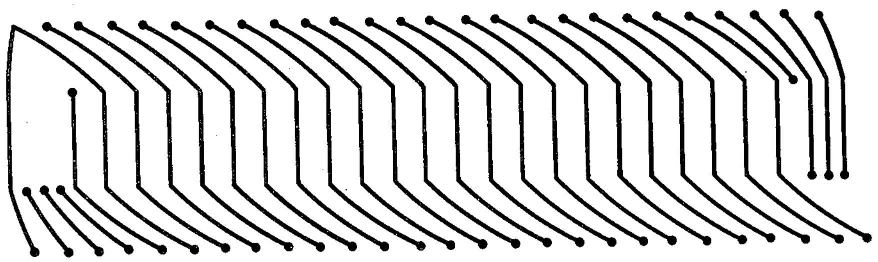
Figure 4:
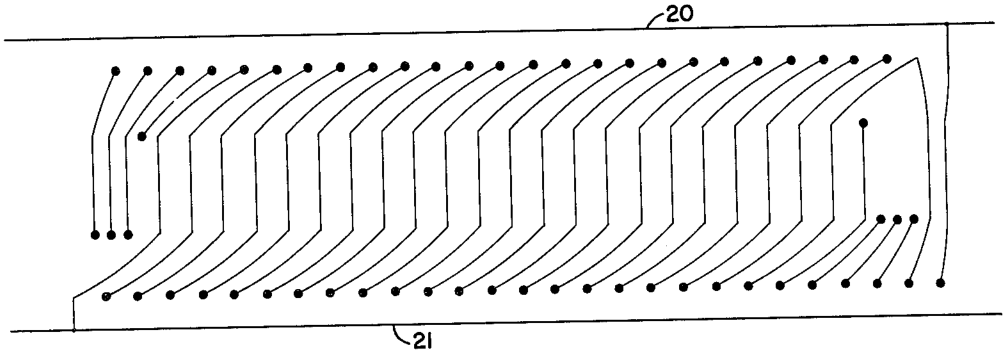

In the drawing, FIGURE 1 is a schematic showing of a linear indicator using my invention, FIGURE 2 is a diagrammatic showing of a tape "rotor" for use in the structure of FIGURE 1, FIGURES 3 and 4 are views like FIGURE 2 showing the upper and lower surface pattern respectively, both being viewed from the same direction, and FIGURE 5 is a modification of the invention having a "rotor" in the form of a disc.

Turning now to FIGURE 1, a laminate substrate or tape 10 is carried on a pair of drums 11 and 12 rotatable about parallel axes. The tape is of electrically insulating, nonmagnetic material, and moves between a stator assembly 13 and a flux return assembly 14, the latter being made up of a stacked plurality of laminations individually perpendicular to tape 10. Assemblies 13 and 14 are longitudinally aligned with tape 10 to define an electromagnetic pole structure, and stator assembly 13 comprises a plurality of sets of salient poles, each carrying a distributed winding, to comprise physical electromagnetic poles identified by the reference numerals 15, 16, 17, which can be electrically energized to have strengths and polarities related as trigonometric functions of angles differing by 120°.

While tape 10 is shown in FIGURE 1 as endless, it will be understood that if desired the tape may have two ends wound respectively about the drums.

The upper and lower laminae of tape 10 comprise printed electrically conducting patterns shown respectively in FIGURES 3 and 4, and these patterns are joined, at points identified in the figures by the heavy dots, by throughplating traversing holes in the central lamina of the tape from one surface to the other, so as to comprise a single continuous winding or current path adapted when energized directly to produce at least one pair of effective magnetic poles spaced along the tape, and adapted to receive a voltage induced from the stator windings, when the latter are energized with alternating voltage in suitable phase relationship, which varies in amplitude and sense with the relative positions of the tape and the stator. For a purpose of making connection with the continuous winding, conductive strips 20 and 21 extending along the edges of the tape comprise portions of the lower pattern and are energized by wipers 22 and 23 suitably mounted on and insulated from the housing of the indicator.

In FIGURE 2 the stator poles are schematically suggested and it is understood that when the continuous tape winding is energized each pair of poles produced therein extends through a length of tape equal to that covered by the set of stator poles, and that additional poles are present in the tape toward the ends thereof. It will also be understood that the length of the tape, compared to the length of the stator assembly, is not limited.

Indicia are printed of the face of tape 10 for visual observation relative to a suitable fixed index identified by reference numeral 24, and the placing of the indicia is determined by the desired location of index 24. For the case of the tape with its ends wound on the two drums, it may be desirable to interchange stator assembly 13 and flux return assembly 14, and incorporate index 24 into the latter.

As pointed out above, FIGURES 3 and 4 illustrate the separate patterns printed on the upper and lower surfaces of the substrate tape. Each of these patterns includes a plurality of independent electrical conductors extending generally transversely of a central horizontal reference line, not shown, from a first aperture to a second aperture displaced therefrom in the direction of a reference line and in most instances lying on the opposite side of the reference line from the first aperture. However, when the throughplating has been accomplished, the two patterns of independent conductors are functionally interconnected, so that the patterns combine with the throughplating to comprise a single current path extending continuously from conductor 20 to conductor 21.

In order to make this clear, sucessive points along the current path have been numbered in numerical order in FIGURE 2. It will be apparent at once that the path traverses cyclically back and forth from one side to the other of the reference line, crossing the latter upwardly between 1 and 2, downwardly between 2 and 3, and so on, and that no two successive crossings of the reference line by the path occur on adjacent conductors. It will also be apparent that the path traverses cyclically back and forth from the left end of the reference line to the right end (1, 2, 3, 4, 5) and then back to the left end (6, 7, 8, 9, 10) and so on, although several crossings of the reference line take place while the path is traversing once along the line. The path traverses across the line 56 times while it is traversing along the line 11 times.

A study of FIGURE 2 will also make it clear that when adjacent traverses of the path across the reference line are considered in order, they occur in directed groups, a plurality of crossings all in one direction being followed by a plurality of crossings all in the opposite direction: except for the two end groups, each group includes 11 crossings.

FIGURE 5 shows the principle of the invention applied to the case where rotary rather than linear motion of the indicia is designed. In this case the movable element or "rotor" is a laminate disc 10′ carrying the patterns as its upper and lower laminae, and sliders 22′ and 23′ engage conducting strips 20′ and 21′ which are now circumferential. The stator assembly in this form of the invention is arcuate rather than rectilinear.

It will be evident that when the closed winding is energized with alternating voltage of a fixed phase, and poles 15, 16 and 17 are energized to have strengths and polarities related as trigonometric functions of angles differing by 120°, tape 10 moves to a position, relative to the poles, which is uniquely determined by those angles, while if the closed winding is energized as above, but the pole structure is not energized, voltages will be induced in the distributed windings which vary uniquely with the position of the tape relative thereto.

An obvious modification of the invention is to use a drum instead of a disc, and modify the stator laminations accordingly.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. In combination: a thin substrate of electrically insulating material having rows of apertures spaced from and aligned with a reference line and extending through said substrate; a first pattern of independent electrical conductors on one surface of said substrate, each of said conductors extending generally transversely of the reference line from a first aperture to a second aperture displaced in the direction of the reference line from the first aperture; a second pattern of independent electrical conductors on the other surface of said substrate, each of said conductors extending generally transversely of the reference line from a first aperture to a second aperture displaced in the direction of the reference line from the first aperture; electrically conducting means extending through said apertures individually and making connections between the respective conductors of said patterns which terminate at the several apertures to complete a single current path which traverses cyclically back and forth, both along and across the reference line, the number of traverses of said path in the direction of the reference line being less than the number of crossings of said path across the reference line and no two successive crossings of the reference line by the path occurring on adjoining conductors, so that when adjoining crossings are considered in order, beginning at one end of the reference line, groups of crossings all in one direction alternate with groups of crossings all in the other direction to define therebetween, when electric current flows along said path, a plurality of serially contiguous magnetic pole areas of successively opposite polarities, the number of pole areas being an order of magnitude less than the number of said crossings; and means making electrical connections to the ends of said path.

2. Apparatus according to claim 1 in which the number of crossings in one of said groups is equal to the number of traverses of said path in the direction of the reference line.

3. Apparatus according to claim 1 together with means mounting said substrate for reversible movement aligned with the reference line.

4. Apparatus according to claim 3 together with a pole structure including at least three wound salient poles mounted adjacent to said substrate for magnetic cooperation with poles resulting from electrical energization of said current path, said salient poles being serially contiguous in the direction of the reference line.

5. Apparatus according to claim 4 together with means energizing said current path with single phase alternating current, means for causing said reversible movement of said substrate, and means responsive to induced currents in the windings of said pole structure.

6. Apparatus according to claim 5 together with means energizing said current path with single phase alternating current, means energizing the windings of said pole structure with three-phase alternating voltage, and means responsive to movement of said substrate.

References Cited in the file of this patent

UNITED STATES PATENTS

| | | |
|---|---|---|
| 2,799,835 | Tripp et al. | July 16, 1957 |
| 2,831,131 | Klote | Apr. 15, 1958 |
| 2,867,783 | Childs | Jan. 6, 1959 |
| 2,886,880 | Eisler | May 19, 1959 |
| 2,915,721 | Farrand et al. | Dec. 1, 1959 |
| 2,970,238 | Swiggett | Jan. 31, 1961 |

FOREIGN PATENTS

| | | |
|---|---|---|
| 562,277 | Germany | Jan. 20, 1933 |
| 714,677 | Great Britain | Sept. 1, 1954 |
| 1,234,294 | France | May 16, 1960 |

OTHER REFERENCES

Electronic publication, "Electronics," March 20, 1959, pages 70–73.